United States Patent [19]

Sakai

[11] Patent Number: 4,898,050

[45] Date of Patent: Feb. 6, 1990

[54] SYSTEM FOR CONTROLLING THE PRESSURE OF OIL FOR A CONTINUOUSLY VARIABLE TRANSMISSION

[75] Inventor: Yasuhito Sakai, Higashimurayama, Japan

[73] Assignee: Fuji Jukogyo Kabushiki Kaisha, Tokyo, Japan

[21] Appl. No.: 185,430

[22] Filed: Apr. 25, 1988

[30] Foreign Application Priority Data

Apr. 28, 1987 [JP] Japan ................................ 62-105653

[51] Int. Cl.$^4$ ............................................ B60K 41/12
[52] U.S. Cl. ....................................................... 74/867
[58] Field of Search .................................. 74/866, 867

[56] References Cited

U.S. PATENT DOCUMENTS 4,478,105 10/1984 Yamamura et al. .................... 74/730
4,718,308 1/1988 Haley ................................ 74/867 X
4,733,582 3/1988 Eggert et al. ......................... 74/867

FOREIGN PATENT DOCUMENTS 59-17054 1/1984 Japan .

Primary Examiner—Dirk Wright
Attorney, Agent, or Firm—Martin A. Farber

[57] ABSTRACT

A continuously variable transmission has a torque converter with a lockup clutch. A high pressure oil pump is provided adjacent the transmission and a low pressure oil pump provided adjacent the torque converter. A line pressure control valve is provided for controlling the pressure of oil supplied from the high pressure oil pump to produce a line pressure for operating the transmission. Another control valve is provided for controlling the pressure of oil supplied from the low pressure oil pump and for supplying the controlled oil to the torque converter and the lockup clutch, for operations thereof.

9 Claims, 4 Drawing Sheets

SYSTEM FOR CONTROLLING THE PRESSURE OF OIL FOR A CONTINUOUSLY VARIABLE TRANSMISSION

BACKGROUND OF THE INVENTION

The present invention relates to a hydraulic control system for a continuously variable belt-drive automatic transmission for a motor vehicle, and more particularly to a system for controlling pressure of oil in a hydraulic circuit for the transmission.

A continuously variable transmission with a torque converter having a lockup clutch is known. The transmission is controlled by a high line pressure of 30 to 40 kg/cm$^2$ at maximum and the torque converter is controlled by lower control pressure of 4 to 6 kg/cm$^2$. The transmission is further provided with a multiple-disk friction clutch in a selector device and transfer clutch for a four-wheel drive system. These clutches are independently operated by respective pressures of oil. Accordingly, it is necessary to control the respective pressures with accuracy.

Japanese Patent Laid Open 57-161360 (U.S. Pat. No. 4,478,105) discloses a system in which the pressure of oil from an oil pump is adjusted by a line pressure control valve for controlling drive and driven pulleys of the transmission. The line pressure control valve produces a control pressure for controlling a torque converter, a lockup clutch, a lockup control valve, and a clutch for a selector device.

However, in such a system, since the oil pump must supply oil to various devices at different pressures, an oil pump having a large discharge capacity is required, as shown in FIG. 3b. Further, since efficiency of the oil pump reduces at high pressure as shown in FIG. 3a, pumping loss is large and the lifetime of the pump driving shaft is shortened.

On the other hand, when the transmission is rapidly upshifted, a large amount of oil is fed to a cylinder of a drive pulley. As a result, converter pressure reduces. Further, since it is difficult to adjust converter pressure, the control pressure for the lockup control valve and clutches becomes excessively large, and the control pressure may vary with the variation of the line pressure.

Accordingly, it is desirable for a hydraulic system for supplying control pressure for the torque converter to be separated from a hydraulic system for supplying the line pressure for the transmission so as to independently produce the necessary pressures.

Japanese Patent application Laid-open 59-17054 discloses a system in which two oil pumps are provided for controlling the drive pulley and the driven pulley of the transmission, respectively. However, it does not suggest a pump for supplying oil to a torque converter.

SUMMARY OF THE INVENTION

The object of the present invention is to provide a hydraulic control system which is divided into an oil supply system for the transmission and an oil supply system for the torque converter, thereby controlling their respective pressures with accuracy and reducing the pumping loss.

The other objects and features of this invention will become understood from the following description with reference to the accompanying drawings.

DETAILED DESCRIPTION OF THE PREFERRED EMBODIMENT

Figure 1A:
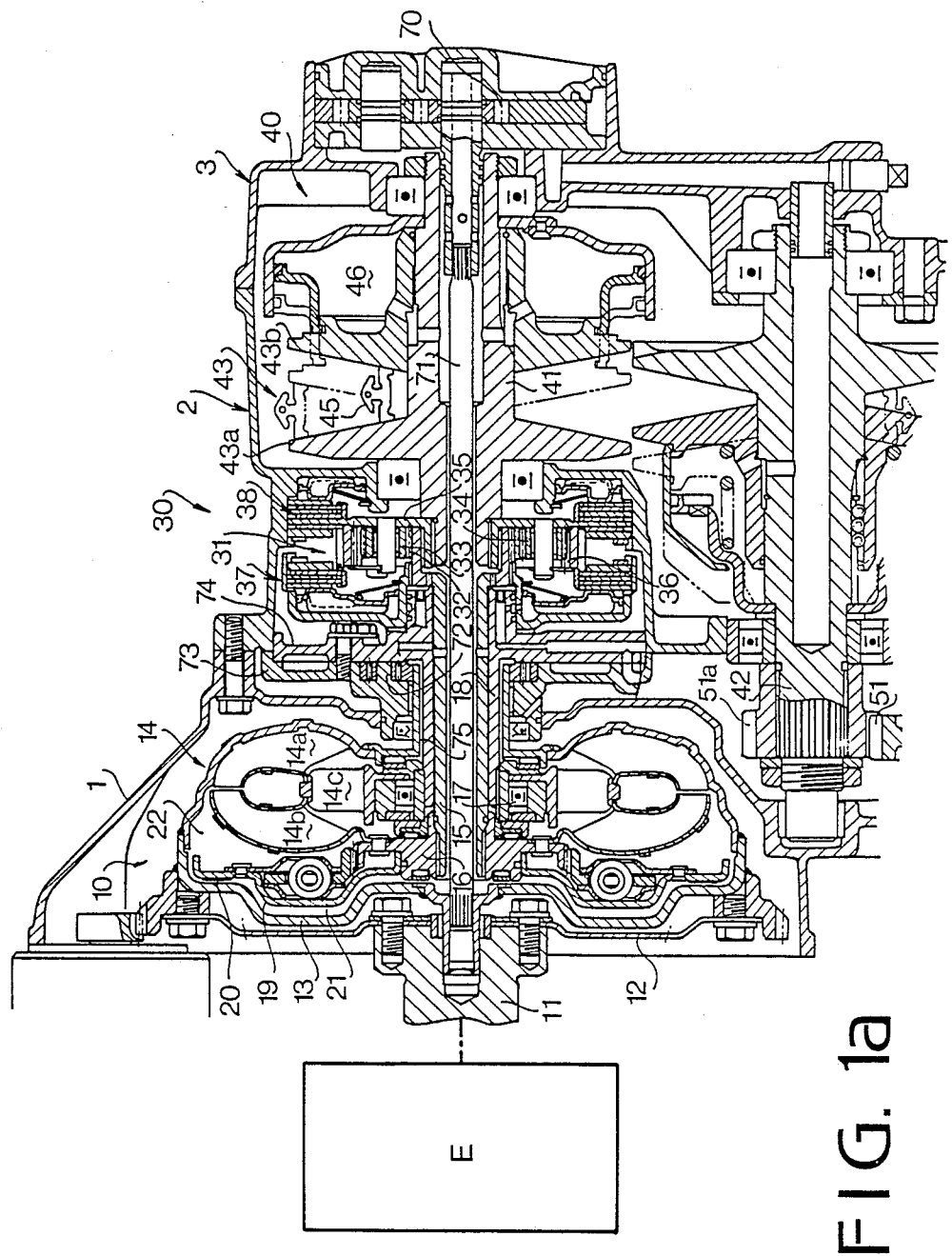
Figs 1a and 1b show a sectional view of a continuously variable belt-drive transmission to which the present invention is applied.
Figure 1B:
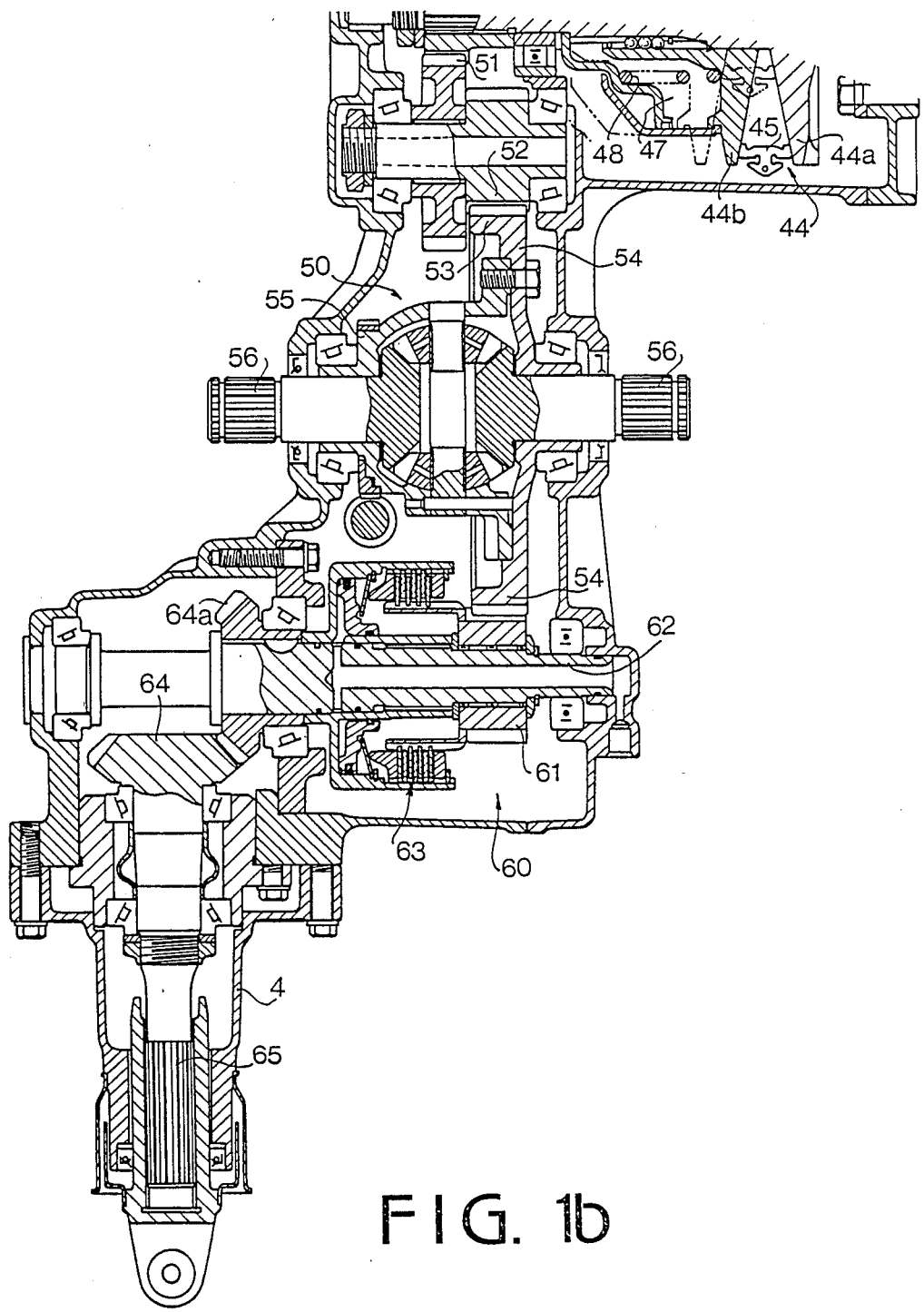

Figs. 1a and 1b show a four-wheel drive power transmission system with a continuously variable belt-drive automatic transmission for a motor vehicle, to which the present invention is applied. An engine E is transversely mounted on a motor vehicle at a front portion thereof. The power transmission system comprises a torque converter device 10, a selector device 30, a continuously variable belt-drive transmission 40, a final reduction device 50, and a transfer device 60. The torque converter device 10 is provided in a housing 1. The selector device 30, transmission 40, final reduction device 50 and transfer device 60 are provided in a main housing 2 and a side housing 3. An extension case 4 is secured to the housing 1.

The torque converter device 10 has a torque converter 14 with a lockup clutch 19. A drive plate 12 is fixed to a crankshaft 11 of the engine E. A converter cover 13 is secured to the drive plate 12. The torque converter 14 comprises an impeller 14a integral with the converter cover 13 by welding, a turbine 14b fixed to a turbine hub 16 which is splined to an input shaft 15, and a stator 14c connected to a hollow stator shaft 18 through a one-way clutch 17. The lockup clutch 19 is disposed between the converter cover 13 and the torque converter 14, and a facing 20 of the lockup clutch 19 is attached for making contact with the cover 13. Further, in the torque converter device 10, a release side oil chamber 21 is defined adjacent the converter cover 13 for applying release pressure to the lockup clutch 19, and an apply side oil chamber 22 is formed adjacent the torque converter 14 for applying lockup pressure to the lockup clutch 19.

The selector device 30 comprises a planetary gear 31 having a pair of pinions 33 and 34, and a sun gear 32 mounted on the input shaft 15. Pinions 33 and 34 are supported on a carrier 35. The sun gear 32 is engaged with a ring gear 36 through pinions 33 and 34. A forward clutch 37 is disposed between the sun gear 32 and the ring gear 36. A reverse brake 38 is disposed between the ring gear 36 and the main case 2. At forward driving such as a drive (D) range selection, the forward clutch 37 is engaged to lock the sun gear 32. At reverse driving, the reverse brake 38 is engaged to lock the ring gear 36 for reversely rotate the carrier 35. If the number of teeth of the ring gear 36 is determined twice as many as that of the sun gear 32, a gear ratio at the reverse driving is equal to that at the forward driving.

The belt-drive transmission 40 has a main shaft 41 engaged with the carrier 35 and an output shaft 42 provided in parallel with the main shaft 41. A drive pulley (primary pulley) 43 and a driven pulley (secondary pulley) 44 are mounted on the main shaft 41 and output shaft 42, respectively. A fixed conical disc 43a of the drive pulley 43 is integral with main shaft 41 and an axially movable conical disc 43b is axially slidably mounted on the main shaft 41. The movable conical disc 43b also slides in a cylinder 46 formed on the main shaft 41 to provide a servo device.

A fixed conical disc 44a of the driven pulley 44 is formed on the output shaft 42 opposite the movable conical disc 43b and a movable conical disc 44b is slidably mounted on the shaft 42 opposite the disc 43a. Movable conical disc 44b has a cylindrical portion which is slidably engaged in a cylinder 47 of the output shaft 42 to form a servo device. A spring 48 is provided to urge the movable conical disc 44b toward the fixed conical disc 44a. A drive belt 45 engages with the drive pulley 43 and the driven pulley 44. The cylinder 46 of the drive pulley 43 is so designed that the pressure receiving area thereof is larger than that of the cylinder 47 of the driven pulley 44. Thus, the running diameter of the belt 45 on the pulleys is varied dependent on driving conditions.

Secured to the output shaft 42 is a drive gear 51a of the final reduction device 50 which engages with an intermediate reduction gear 51 on an intermediate shaft 52. An intermediate gear 53 on the shaft 52 engages with a final reduction gear 54. The rotation of the final reduction gear 54 is transmitted to axles 56 of front driving wheels of the vehicle through a differential 55.

The transfer device 60 comprises a transfer gear 61 engaged with the final reduction gear 54 and rotatably mounted on a transfer shaft 62 which is transversely disposed and rotatably supported by bearings, and a transfer clutch 63 in the form of a fluid operated multiple-disk friction clutch. The transfer clutch 63 operates to couple the gear 61 with the shaft 62, so that the rotation of the gear 61 is transferred to rear drive wheels of the vehicle through shaft 62, bevel gear 64a secured to the shaft 62, bevel gear 64 engaged with the bevel gear 64a and rear drive shaft 65.

In the side housing 3, an oil pump 70 is provided for supplying a high pressure of oil for the transmission. The main shaft 41 has an axial passage in which an oil pump driving shaft 71 connected to the crankshaft 11 is rotatably mounted. An oil pump 72 for the torque converter device 10 is housed in a pump housing 73 and a cover 74 at the rear end of the housing 1. A pump drive shaft 75 is connected to the impeller 14a and is operatively connected with a rotor of the oil pump 72.

Thus, the oil pump 70 is disposed adjacent the transmission 40, and oil pump 72 is disposed adjacent the torque converter device 10.

Figure 2A:
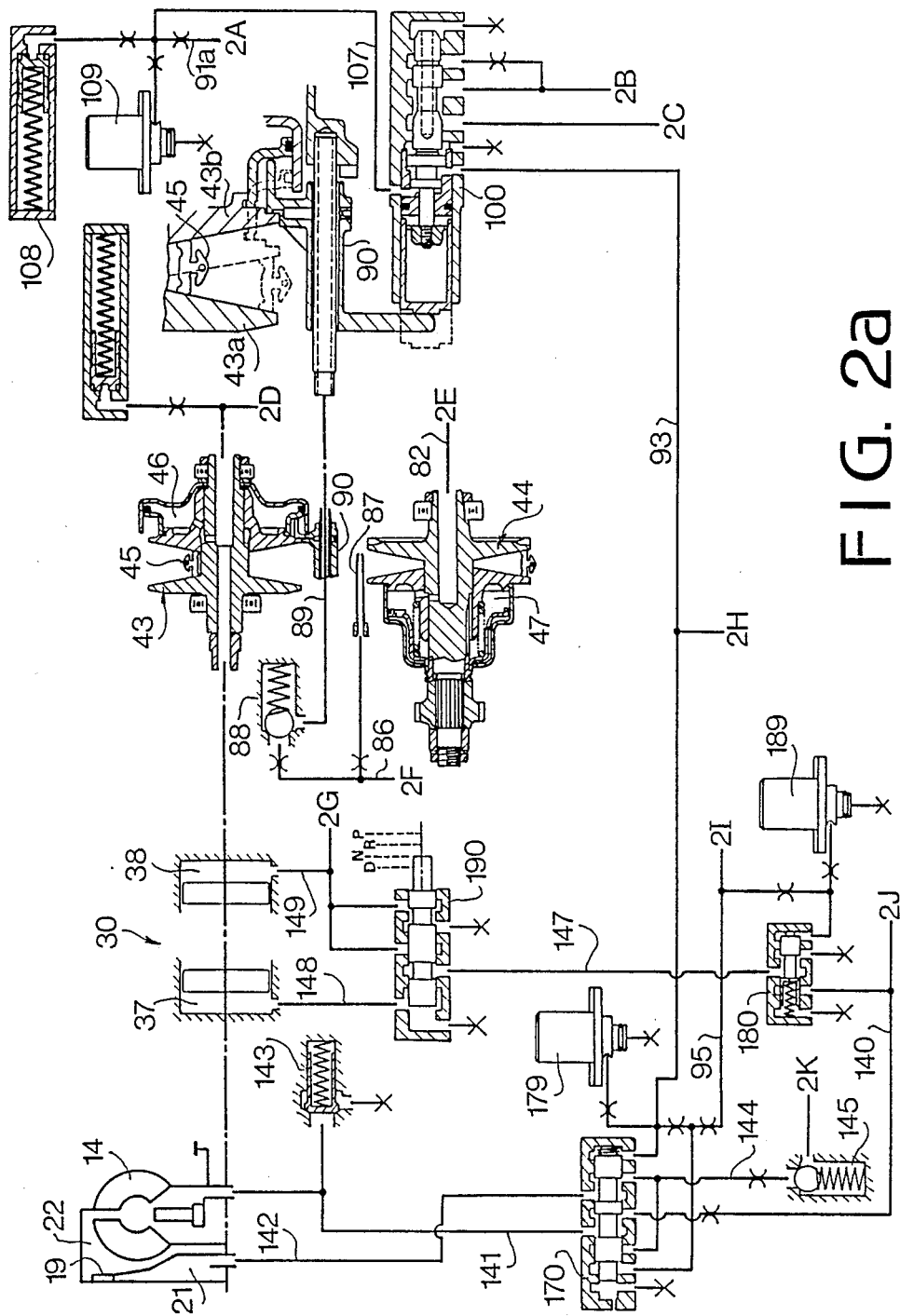
FIGS. 2a and 2b show a hydraulic control circuit according to the present invention (in FIGS. 2a and 2b the common references 2A . . . 2K represent continuing passages between these figures)
Figure 2B:
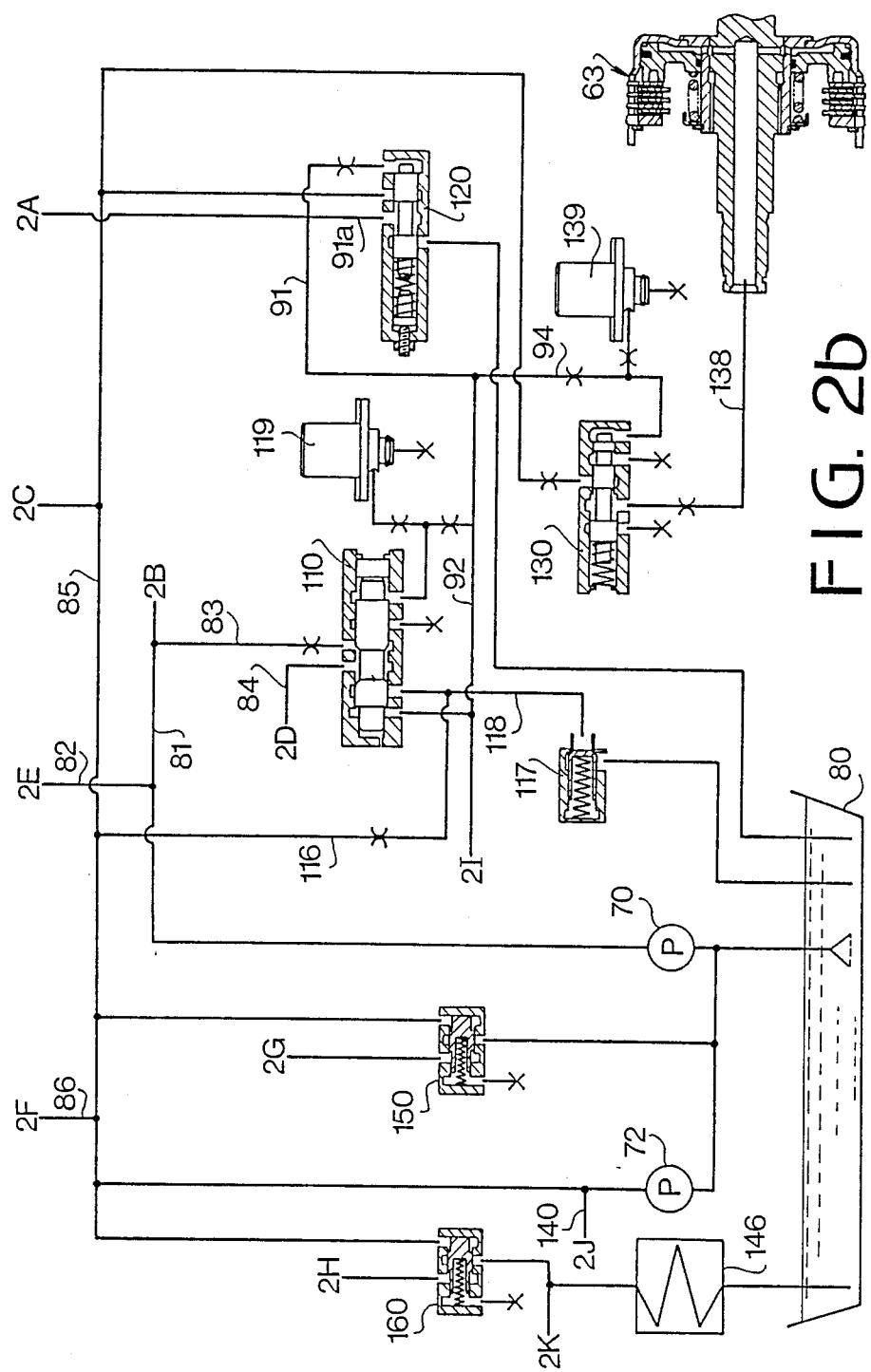
Figure 3B:
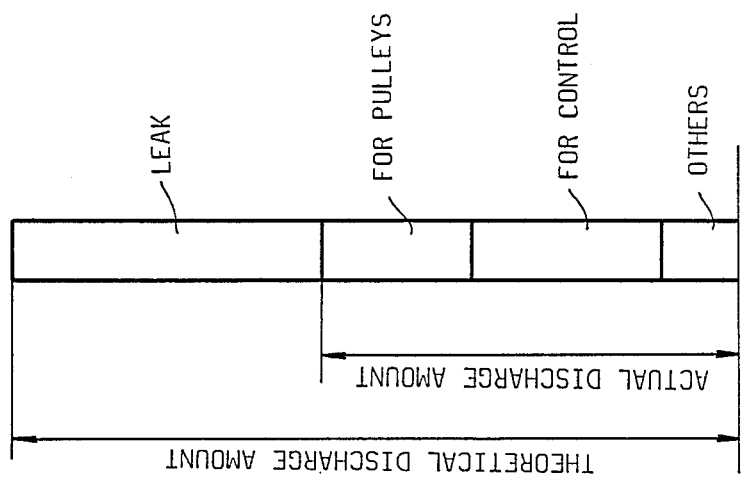
FIG. 3b is a graph showing a discharge characteristic of the oil pump.
Figure 3A:
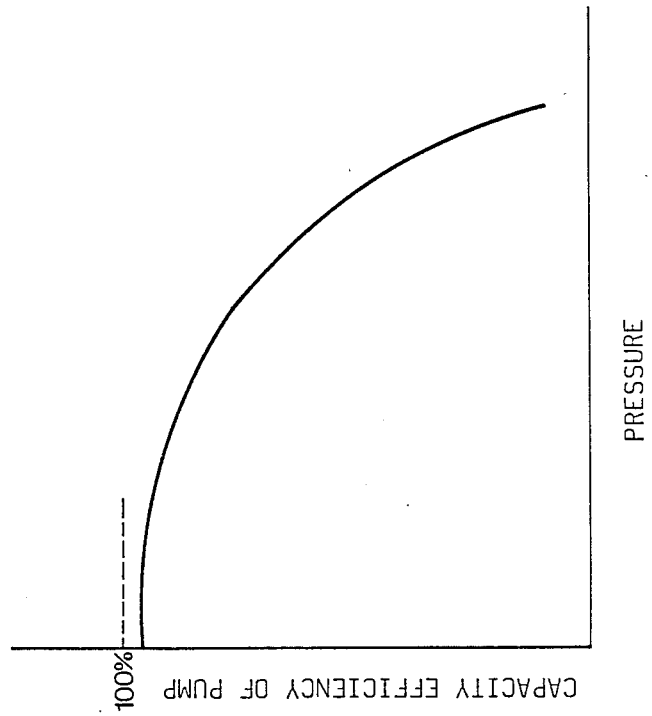
FIG. 3a is a graph showing efficiency of an oil pump.

Referring to FIGS. 2a and 2b, showing a hydraulic control circuit, oil in an oil reservoir 80 is supplied to a line pressure control valve 100 through a line pressure passage 81 by the pump 70. An oil passage 82 connected to the passage 81 is communicated with the cylinder 47 of the driven pulley 44. The passage 81 is further communicated with a transmission ratio control valve 110 through a passage 83. The cylinder 46 of drive pulley 43 is applied with pressurized oil passing through the passage 81, passage 83, transmission ratio control valve 110, and a passage 84.

A passage 140 connected to the oil pump 72 is communicated with a passage 85. The pressure of oil supplied to the passage 85 is regulated by a pair of relief valves 150 and 160 to produce a low control pressure. The passage 85 is connected to a drain port of the line pressure control valve 100.

A part of the oil in the passage 85 is supplied to the drive pulley 44 from a nozzle 87 passing through a passage 86 to lubricate the pulley device. The passage 86 is further communicated with a passage 89 through a check valve 88. The passage 89 is communicated with a lubricating oil tube on which a transmission ratio sensing shoe 90 is slidably mounted.

The passage 85 is communicated with a reducing valve 120 for providing a constant reducing pressure of oil. A conduit 91a is communicated with the line pressure control valve 100 through a passage 107. The conduit 91a is also communicated with a solenoid operated on-off valve 109 and with an accumulator 108. Further, a conduit 91 is communicated with the transmission ratio control valve 110 through a passage 92 and with a solenoid operated on-off valve 119.

The solenoid operated valve 109 is adapted to be operated by duty signals for producing control pressure in the form of pulses and the control pressure is applied to the line pressure control valve 100. Further, the line pressure control valve 100 is applied with signals dependent on the transmission ratio from the sensor shoe 90 and on oil pressure through a passage 93 in accordance with conditions of the torque converter, so that the line pressure is controlled in accordance with the transmission ratio, engine torque, and torque increasing factor of the torque converter.

The solenoid operated valve 119 is also operated by duty signals and produces reducing pressure which is applied to the transmission ratio control valve 110 for shifting a spool of the valve 110 to an oil supply position and an oil drain position by the degree of duty cycle. Thus, the flow rate of oil supplied to or drained from the cylinder 46 of drive pulley 43 is controlled to provided optimum transmission ratio.

A drain passage 118 is communicated with the oil reservoir 80 through a check valve 117. A prefill passage 116 is provided between the passage 85 and a position upstream of the check valve 117. Thus, oil is supplied to the cylinder 46, even if the transmission ratio control valve 110 is in the drain state, thereby improving the starting characteristic.

The passage 85 is communicated with the transfer control valve 130, and a solenoid operated valve 139 for the transfer control valve 130 is communicated with the reducing valve 120 through a passage 94. The solenoid operated valve 139 actuates the transfer control valve 130 to produce clutch pressure which is supplied to the transfer clutch 63 through a passage 138 for controlling clutch torque dependent on driving conditions.

The passage 140 is communicated with the lockup control valve 170. The lockup control valve 170 is communicated with the torque converter 14 through a passage 141 and the release side oil chamber 21 of the lockup clutch 19 through a passage 142. A relief valve 143 is provided on the passage 141 for preventing increase of pressure in the torque converter 14 when the torque converter is locked up. A drain passage 144 of the lcokup control valve 170 is communicated with the oil reservoir 80 through a check valve 145 and an oil cooler 146. The lockup control valve 170 is communicated with the reducing valve 120 through passages 95, 92 and 91 for supplying the reducing pressure. The reducing pressure is also supplied to the passage 93 communicated with the line pressure control valve 100 and to a solenoid operated on-off valve 179. The solenoid operated valve 179 operates the lockup control valve 170 to communicate the passage 140 with the passage 141 or the passage 142, and to produce converter condition pressure in the passage 93.

The passage 140 is further communicated with a safety lock valve 180 which is connected to a selector valve 190 through a passage 147. The selector valve 190 is provided for selectively connecting passages in accordance with operations of a selector lever for selecting operational ranges such as a parking range (P), reverse range (R), neutral range (N), and drive range (D). The selector valve 190 is communicated with the forward clutch 37 through a passage 148 and with the reverse brake 38 through a passage 149.

The safety lock valve 180 has a solenoid operated on-off valve 189 which is supplied with the reducing pressure of the reducing valve 120 through passage 95 to forcibly drain the oil in the forward clutch 37 or the reverse brake 38 to disengage the transmission.

Describing operation of the system, the system supplies pulse signals to the solenoid operated valves 109, 119, 139, 179 and 189 to operate them at duty cycles dependent on driving conditions. When the engine starts, the oil pumps 70 and 72 are driven to supply oil to the system. The high line pressure is supplied by the oil pump 70 to the passage 81 and controlled by the line pressure control valve 100. The cylinder 47 of the driven pulley 44 is supplied with the line pressure adjusted by the line pressure control valve 100 through the passages 81, 82. Thus, the continuously variable transmission 40 provides the largest transmission ratio at low engine speed stage.

On the other hand, a low control pressure of oil adjusted by the relief valves 150 and 160 is supplied to passages 140 and 85. From the low control pressure, the reducing valve 120 produces a reducing pressure which is applied to solenoid operated valves 109, 119, 139, 179 and 189. The low control pressure is supplied to the transfer control valve 130 through the passage 85 to produce the clutch pressure which is supplied to the transfer clutch 63. The control pressure is also supplied to the lockup control valve 170 through the passage 140. When starting of the vehicle, the passage 140 is communicated with the passage 142 by the operation of the solenoid operated valve 179. Thus, the pressure of the oil is applied to the torque converter 14 through the release side oil chamber 21 and drained to the oil reservoir 80 through the passages 141 and 144. The lockup clutch 19 is disengaged and the torque converter 14 is in operating state. In a normal state, the safety lock valve 180 operates to communicate the passage 140 with the passage 147 by the solenoid operated valve 189, so that the selector valve 190 is supplied with the control pressure.

When the P or N range is selected at starting, oil in the forward clutch 37 and the reverse brake 38 are drained. Thus, the planetary gear 31 is released to disengage the transmission 40.

When the D range is selected, the control pressure is applied to the forward clutch 37 to lock the planetary gear 31, so that the input shaft 15 is engaged with the main shaft 41. Thus, the torque converter 14 operates to transmit the power of the engine to the automatic transmission 40. The power of the engine is transmitted to the output shaft 42 at the largest transmission ratio by the driving belt 45 and pulleys 43, 44, and further transmitted to axles of the driving wheels of the vehicle through the final reduction device 50. Thus, the vehicle is started.

In this state, converter pressure is supplied to the line pressure control valve 100 by the operation of the lockup solenoid 179 through the passage 93 to increase the line pressure. The torque converter 14 increases the torque in accordance with the speed, and the increased torque is transmitted through the transmission 40 without slipping of the belt 45 due to the high line pressure.

After starting, when the torque converter 14 reaches a condition for a lockup range, and the solenoid operated valve 179 is turned off, the oil in the release side chamber 21 is drained through the passage 142 so that lockup clutch 19 is pushed by the oil pressure in the apply side chamber 22. Thus, the facing 20 comes in contact with the converter cover 13 to lock the crankshaft 11 and the lockup clutch 19, which means locking of the torque converter 14. Therefore, the engine power can be transmitted to the input shaft 15 through the lockup clutch 19.

In this state, converter pressure in the passage 93 becomes zero, so that the line pressure is controlled by the line pressure control valve 100 without the torque increasing factor, thereby preventing the line pressure supplied to the pulleys from exceeding. The transmission ratio control valve 110 is operated by solenoid valve 119, for controlling the pressure applied to the cylinder 46 of the drive pulley 43. Thus, the transmission ratio is controlled at a predetermined transmission ratio changing speed rate.

When the R range is selected, the reverse brake 38 is supplied with the pressure of oil to rotate the carrier 35 in reverse for providing reverse driving.

In accordance with the present invention, since the system is provided with two oil pumps for supplying high pressure and low pressure to the transmission and the torque converter respectively, pumping loss is reduced. Since, each of respective oil pump is disposed adjacent the transmission and the torque converter, respectively, the oil is efficiently supplied to a desired element, and the system is simplified in construction. By the exclusive oil pump, the application of high line pressure is ensured at a rapid transmission ratio change with reduction of the control pressure of the torque converter.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. In a system for controlling pressure of oil for a continuously variable transmission for transmitting power of an engine to wheels of a vehicle, the transmission having pulleys and a belt running thereon, hydraulic cylinders for changing running diameters of the pulleys, a torque converter with a lockup clutch, and a selector device for selecting forward and reverse drives, the system having a hydraulic circuit including a transmission ratio control valve and a line pressure control valve for controlling the hydraulic cylinders, and a lockup control valve for controlling said torque converter with said lockup clutch, the improvement in the system wherein:

each of said control valves has a shiftable spool;
a high pressure oil pump located adjacent the transmission for producing high pressure oil;
a low pressure oil pump located adjacent the torque converter for producing low pressure oil;

both of the oil pumps being operatively connected to the engine so as to be driven by the engine;

a first hydraulic circuit for supplying the high pressure oil to the hydraulic cylinders through the line pressure control valve and the transmission ratio control valve;

a second hydraulic circuit for supplying the low pressure oil to the lockup clutch through the lockup control valve;

a reducing valve supplied with the low pressure oil for producing constant control pressure oil;

a constant pressure circuit for supplying the constant control pressure oil to the transmission ratio control valve, said line pressure control valve and said lockup control valve, for shifting said spools of the respective control valves; and solenoid operated valves communicated with the constant pressure circuit for producing control pressures for controlling the shifting of said spools of said respective control valves so as to control the supplying of the high pressure oil and the low pressure oil to said hydraulic cylinders and said lockup clutch, respectively.

2. The system according to claim 1, wherein
the transmission further comprises a transfer clutch for transmitting the power of the engine to other wheels of the vehicle, the and the system further comprises a transfer control valve for controlling the low pressure oil supplied therethrough to the transfer clutch.

3. The system according to claim 2, wherein
said constant pressure circuit supplies the constant control pressure oil to a spool of said transfer control valve, and another solenoid operated valve controls said constant control pressure oil supplied to said spool of said transfer control valve for controlling the low pressure oil supplied therethrough to the transfer clutch.

4. The system according to claim 1, wherein
said torque converter is connected between said engine and said pulley of the continuously variable transmission.

5. The system according to claim 4, wherein
said selector device is connected between said torque converter and said pulleys of the continuously variable transmission.

6. The system according to claim 1, wherein
the spool of said line pressure control valve is further controlled, by the control pressures as converter pressure produced by the solenoid operated valve constituting a lockup solenoid which controls aid lockup control valve for the controlling of the torque converter, to produce a high line pressure from said line pressure control valve during starting of the vehicle, preventing slipping of the belt on the pulleys.

7. The system according to claim 6, wherein
said high line pressure produced from said line pressure control valve during starting of the vehicle increases as the torque converter increases torque in accordance with speed, said line pressure control valve and said torque converter being so controlled by said converter pressure produced by said lockup solenoid as a torque increasing factor controlling the shifting of the spools of said line pressure control valve and said lock up control valve until the converter pressure becomes zero at a lockup condition of the lockup clutch, the lockup control valve supplying the low pressure oil to said torque converter via said second hydraulic circuit.

8. The system according to claim 1 wherein said farther comprising solenoid operated valves operate the transmission ratio control valve, line pressure control valve, lockup control valve, respectively, in accordance with driving conditions of the vehicle.

9. The system according to claim 8 wherein the low pressure oil pump is communicated with a lubrication system of the transmission for lubricating necessary parts.

* * * * *